US012664165B2

(12) United States Patent
Watson et al.

(10) Patent No.: US 12,664,165 B2
(45) Date of Patent: Jun. 23, 2026

(54) METHOD AND SYSTEM FOR INFORMATION EXTRACTION AND AGGREGATION

(71) Applicant: JPMorgan Chase Bank, N.A., New York, NY (US)

(72) Inventors: William Watson, Long Beach, NY (US); Naan Cho, New York, NY (US); Nishan Srishankar, Secaucus, NJ (US); Tucker Richard Balch, Suwanee, GA (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/816,826

(22) Filed: Aug. 27, 2024

(65) Prior Publication Data

US 2026/0064683 A1     Mar. 5, 2026

(51) Int. Cl.
*G06F 16/24*          (2019.01)
*G06F 16/2453*        (2019.01)
*G06Q 30/018*         (2023.01)

(52) U.S. Cl.
CPC ..... *G06F 16/24542* (2019.01); *G06Q 30/018* (2013.01)

(58) Field of Classification Search
CPC ........................ G06F 16/24542; G06Q 30/018
See application file for complete search history.

(56) References Cited

U.S. PATENT DOCUMENTS

| | | | |
|---|---|---|---|
| 2024/0414191 A1* | 12/2024 | Humphrey ............ | H04L 63/205 |
| 2025/0053899 A1* | 2/2025 | Hughes ........... | G06Q 10/06393 |
| 2025/0061290 A1* | 2/2025 | Gardner ................ | G06F 16/345 |

OTHER PUBLICATIONS

Pallavi Sinha "Understanding LLM-Based Agents and their Multi-Agent Architecture", May 1, 2024.*

* cited by examiner

*Primary Examiner* — Ajay M Bhatia
*Assistant Examiner* — Cindy Nguyen
(74) *Attorney, Agent, or Firm* — Greenblum & Bernstein, P.L.C.

(57)              ABSTRACT

Various methods and processes, apparatuses or systems, and media for using large language models (LLMs) to extract information from regulatory filings and to aggregate the extracted information in order to generate structured responses to user queries are disclosed. The method includes: receiving a query from a user; using a first LLM to transform the query into a set of action items; using a second LLM to generate plans for responding to each action item; using a third LLM to select an optimum plan for executing the set of action items; using a fourth LLM to assemble a set of fifth LLMs to act as expert LLM sub-agents to perform respective tasks based on the optimum plan; obtaining, from each expert LLM sub-agent, a respective output that results from a performance of the corresponding task; and aggregating the outputs into a single response to the query.

18 Claims, 5 Drawing Sheets

300

400

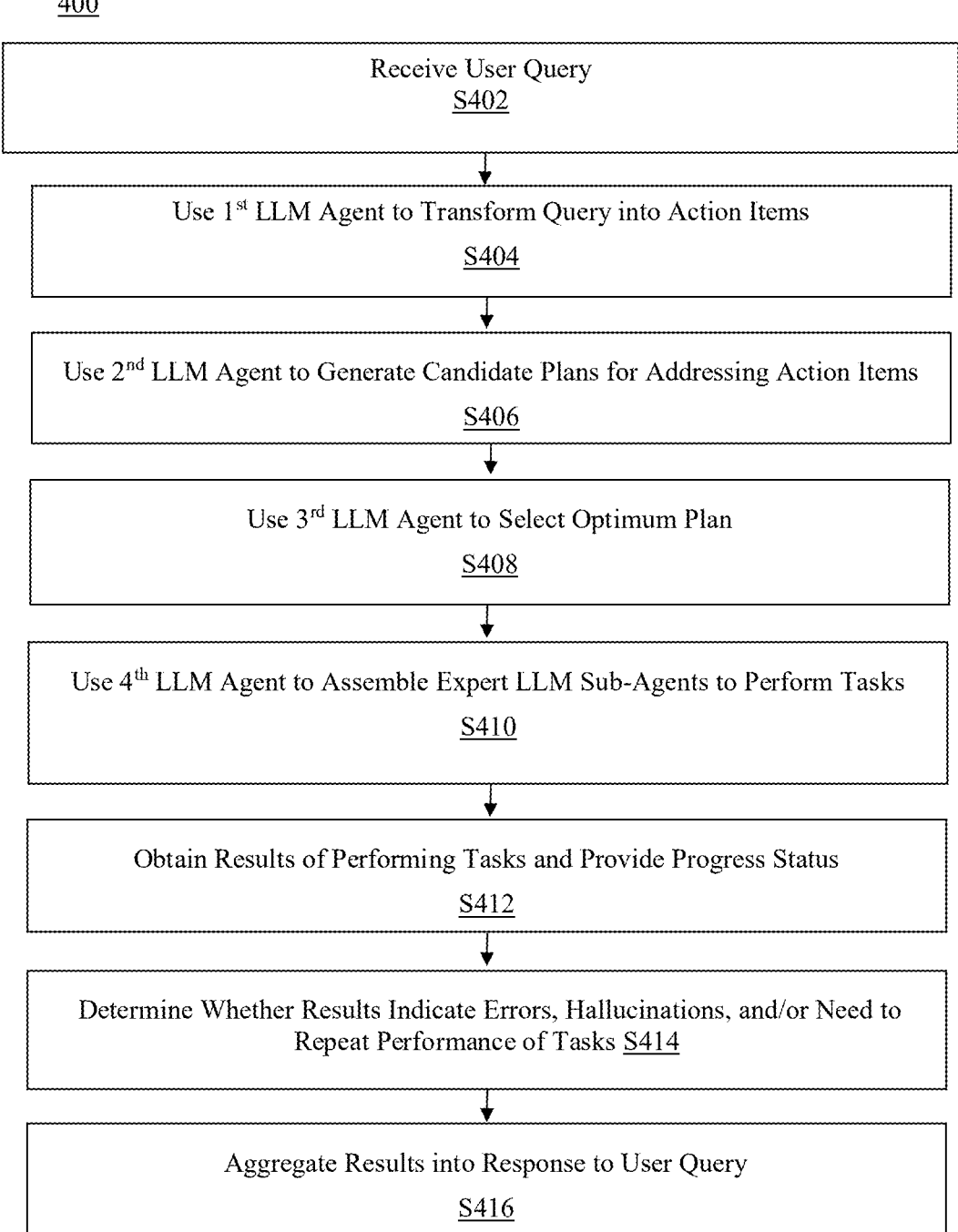

Receive User Query
S402

Use 1st LLM Agent to Transform Query into Action Items
S404

Use 2nd LLM Agent to Generate Candidate Plans for Addressing Action Items
S406

Use 3rd LLM Agent to Select Optimum Plan
S408

Use 4th LLM Agent to Assemble Expert LLM Sub-Agents to Perform Tasks
S410

Obtain Results of Performing Tasks and Provide Progress Status
S412

Determine Whether Results Indicate Errors, Hallucinations, and/or Need to Repeat Performance of Tasks S414

Aggregate Results into Response to User Query
S416

FIG. 4

METHOD AND SYSTEM FOR INFORMATION EXTRACTION AND AGGREGATION

TECHNICAL FIELD

This disclosure relates to methods and apparatuses for using large language models to act as agents to automatically extract specific types of information from regulatory filings and to manipulate and aggregate extracted information from multiple sources in order to generate structured responses to user queries.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

The typical task of search (i.e., "Find me X") involves the set-up of a knowledge base that includes X and the action of retrieving X. This standard process of information retrieval has been partially revolutionized by the advent of Large Language Models (LLMs) as generative artificial intelligence (AI) has aided the process of search. A plethora of studies have been conducted on retrieving X from a single knowledge source, such as those relating to Retrieval Augmented Generation (RAG). However, studies on questions that require multiple steps, multiple reasoning stages or multiple data sets; and studies on how to decompose such a task, plan a series of actions that retrieve insights from a myriad of different knowledge sources, generate variations of those plans, select the most efficient plan, and orchestrate a well-oiled machine which executes on the plan through an agent-based framework have been scarce.

In one example area, agencies house a plethora of publicly available and essential data pertaining to asset managers, funds, and corporations, such as regulatory filings. However, this data is often unstructured and difficult to reconcile across different filings. Moreover, depending on the type of data that a particular user is looking for, the means of structuring insights from such data may also differ.

Accordingly, there is a need for a mechanism for using LLMs to act as agents to automatically extract specific types of information from regulatory filings and to aggregate the extracted information in order to generate structured responses to user queries.

SUMMARY

The present disclosure, through one or more of its various aspects, embodiments, and/or specific features or sub-components, provides, among other features, various systems, servers, devices, methods, media, programs, and platforms for using LLMs to act as agents to automatically extract specific types of information from regulatory filings and to aggregate the extracted information in order to generate structured responses to user queries.

According to an aspect of the present disclosure, a method for using LLMs to extract and aggregate information in order to generate a structured response to a user query is provided. The method may be implemented by at least one processor. The method includes: receiving a query from a user; using a first LLM to determine whether the user query is within a scope of a particular question, whether the user query may require rewording and/or validation, and to act as a query replication LLM agent to transform the query into a plurality of action items; using clones of a second LLM to act as a plan generator LLM agent to generate, in parallel, variants of feasible plans for responding to each of the plurality of action items; using a third LLM to act as a plan selection LLM agent to select an optimum plan from among the generated at least one plan for executing each of the plurality of action items; using a fourth LLM to act as a plan orchestrator LLM agent to assemble a plurality of fifth LLMs to act as expert LLM sub-agents to perform respective tasks based on the selected optimum plan; obtaining, from each of the expert LLM sub-agents, a respective output that results from a performance of the corresponding task; and using the plan orchestrator LLM agent to ensure smooth execution and to aggregate the respective outputs into a single response to the query.

Each expert LLM sub-agent may be configured to generate the respective output by extracting information from a plurality of publicly available governmental regulatory filings. The governmental regulatory filings may include filings that relate to securities transactions.

The query replication LLM agent may be configured to transform the query into the plurality of action items by spelling out acronyms from within the query, determining a time frame for which the query is applicable, and rewording the query based on an input expectation associated with the planning generator LLM agent.

The plan generator LLM agent may be configured to generate at least one plan for responding to the plurality of action items by decomposing the plurality of action items into the respective tasks that are suitable for performance by at least one of the expert LLM sub-agents.

Each expert LLM sub-agent may be configured to operate independently with respect to the other expert LLM sub-agents.

The plan orchestrator LLM agent may be configured to determine, for each respective output obtained from one of the plurality of expert LLM sub-agents, whether the respective output includes at least one from among an error and a hallucinated result.

The plan orchestrator LLM agent may be further configured to determine whether any of the respective tasks requires a reperformance.

The method may further include using the plan orchestrator LLM agent to notify the user of a progress status when the respective output is obtained from each of the expert LLM sub-agents. When a particular one of the expert LLM sub-agents is unable to successfully execute the corresponding one of the respective tasks, the progress status may include information that relates to the inability of the particular one of the expert LLM sub-agents to successfully execute the corresponding one of the respective tasks.

According to another embodiment, a computing apparatus for using LLMs to extract and aggregate information in order to generate a structured response to a user query is provided. The computing apparatus includes a processor; a memory; and a communication interface coupled to each of the processor and the memory. The processor is configured to: receive, from a user via the communication interface, a query; use a first LLM to act as a query replication LLM agent to transform the query into a plurality of action items; use a second LLM to act as a plan generator LLM agent to generate at least one plan for responding to each of the plurality of action items; use a third LLM to act as a plan selection LLM agent to select an optimum plan from among the generated at least one plan for executing each of the plurality of action items; use a fourth LLM to act as a plan orchestrator LLM agent to assemble a plurality of fifth LLMs to act as expert LLM sub-agents to perform respective tasks based on the selected optimum plan; obtain, from each of the expert LLM sub-agents, a respective output that results from a performance of the corresponding task; and use the plan orchestrator LLM agent to aggregate the respective outputs into a single response to the query.

Each expert LLM sub-agent may be configured to generate the respective output by extracting information from a plurality of publicly available governmental regulatory filings. The governmental regulatory filings may include filings that relate to securities transactions.

The query replication LLM agent may be configured to transform the query into the plurality of action items by spelling out acronyms from within the query, determining a time frame for which the query is applicable, and rewording the query based on an input expectation associated with the planning generator LLM agent.

The plan generator LLM agent may be configured to generate the at least one plan for responding to the plurality of action items by decomposing the plurality of action items into the respective tasks that are suitable for performance by at least one of the expert LLM sub-agents.

Each expert LLM sub-agent may be configured to operate independently with respect to the other expert LLM sub-agents.

The plan orchestrator LLM agent may be configured to determine, for each respective output obtained from one of the plurality of expert LLM sub-agents, whether the respective output includes at least one from among an error and a hallucinated result.

The plan orchestrator LLM agent may be further configured to determine whether any of the respective tasks requires a reperformance.

The processor may be further configured to use the plan orchestrator LLM agent to notify the user of a progress status when the respective output is obtained from each of the expert LLM sub-agents. When a particular one of the expert LLM sub-agents is unable to successfully execute the corresponding one of the respective tasks, the progress status may include information that relates to the inability of the particular one of the expert LLM sub-agents to successfully execute the corresponding one of the respective tasks.

According to yet another embodiment, a non-transitory computer readable storage medium storing instructions for using LLMs to extract and aggregate information in order to generate a structured response to a user query is provided. The storage medium includes a set of executable code which, when executed by a processor, causes the processor to: receive a query from a user; use a first LLM to act as a query replication LLM agent to transform the query into a plurality of action items; use a second LLM to act as a plan generator LLM agent to generate at least one plan for responding to each of the plurality of action items; use a third LLM to act as a plan selection LLM agent to select an optimum plan from among the generated at least one plan for executing each of the plurality of action items; use a fourth LLM to act as a plan orchestrator LLM agent to assemble a plurality of fifth LLMs to act as expert LLM sub-agents to perform respective tasks based on the selected optimum plan; obtain, from each of the expert LLM sub-agents, a respective output that results from a performance of the corresponding task; and use the plan orchestrator LLM agent to aggregate the respective outputs into a single response to the query.

Each expert LLM sub-agent may be configured to generate the respective output by extracting information from a plurality of publicly available governmental regulatory filings.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 illustrates an exemplary flow chart of a process for using LLMs to act as agents to automatically extract specific types of information from regulatory filings and to aggregate the extracted information in order to generate structured responses to user queries, in accordance with an embodiment.

DETAILED DESCRIPTION

Figure 1:
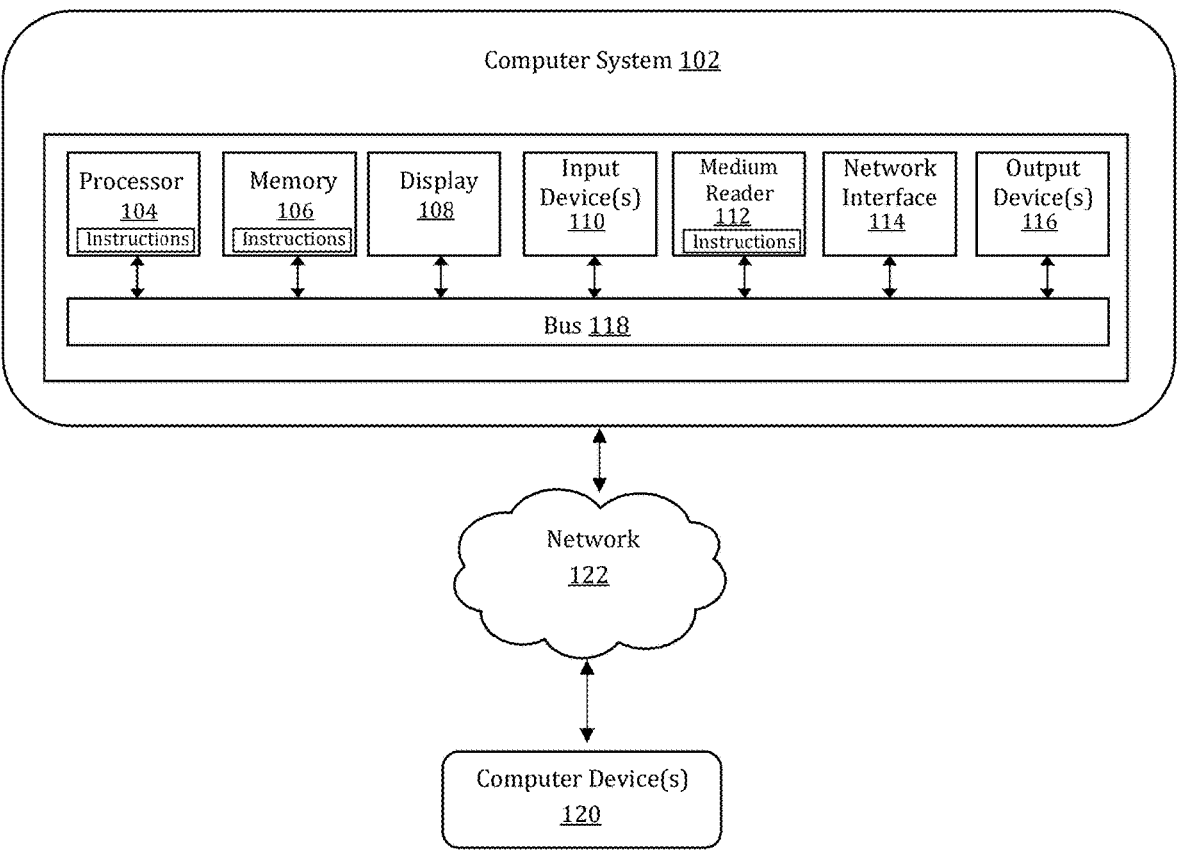
FIG. 1 illustrates a computer system for implementing a method for using LLMs to act as agents to automatically extract specific types of information from regulatory filings and to aggregate the extracted information in order to generate structured responses to user queries, in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a method for using LLMs to act as agents to automatically extract specific types of information from regulatory filings and to aggregate the extracted information in order to generate structured responses to user queries, in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the modules implemented by the system 100 may be platform, language, database, and cloud agnostic that may allow for consistent easy orchestration and passing of data through various components to output a desired result regardless of platform, browser, language, database, and cloud environment by writing programs accordingly. The configuration or data files, in some embodiments, may be written using JavaScript Object Notation (JSON), but the disclosure is not limited thereto. For example, the configuration or data files may easily be extended to other readable file formats such as Extensible Markup Language (XML), YAML Ain't Markup Language (YAML), etc., or any other configuration-based languages.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionality as described herein, and a processor described herein may be used to support a virtual processing environment.

Figure 2:
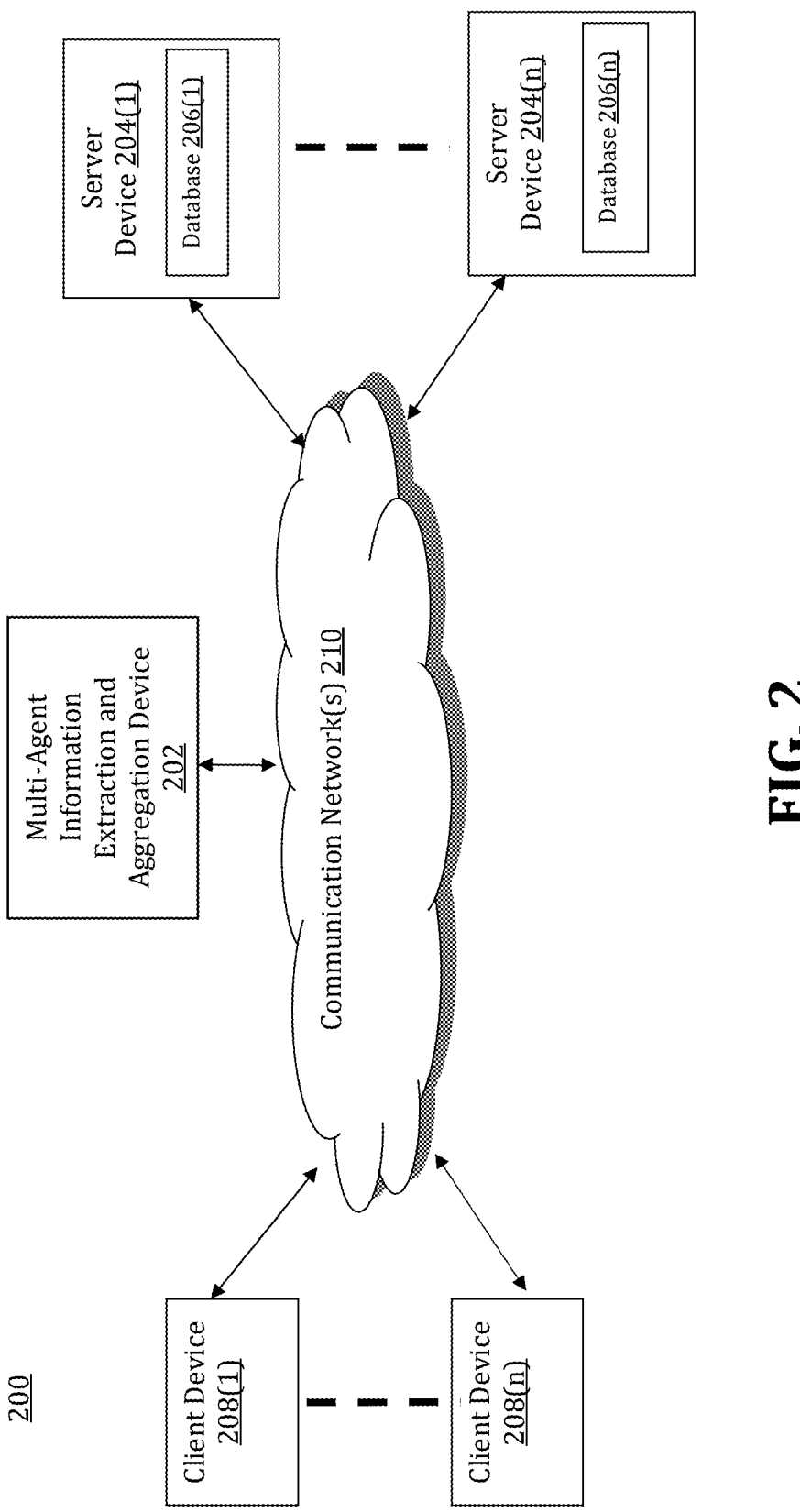
FIG. 2 illustrates an exemplary diagram of a network environment with a device for using LLMs to act as agents to automatically extract specific types of information from regulatory filings and to aggregate the extracted information in order to generate structured responses to user queries, in accordance with an embodiment.

Referring to FIG. 2, a schematic of an exemplary network environment 200 for implementing a multi-agent information extraction and aggregation device (MAIEAD) of the instant disclosure is illustrated.

In some embodiments, the above-described problems associated with conventional tools may be overcome by implementing a MAIEAD 202 as illustrated in FIG. 2 that may be configured for implementing a method for using LLMs to act as agents to automatically extract specific types of information from regulatory filings and to aggregate the extracted information in order to generate structured responses to user queries, but the disclosure is not limited thereto.

The MAIEAD 202 may have one or more computer system 102s, as described with respect to FIG. 1, which in aggregate provide the necessary functions.

The MAIEAD 202 may store one or more applications that can include executable instructions that, when executed by the MAIEAD 202, cause the MAIEAD 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MAIEAD 202 itself, may be located in virtual server(s) running in a cloud-based computing environment rather than being tied to one or more specific physical network computing devices. Also, the application(s) may be running in one or more virtual machines (VMs) executing on the MAIEAD 202. Additionally, in one or more embodiments of this technology, virtual machine(s) running on the MAIEAD 202 may be managed or supervised by a hypervisor.

In the network environment 200 of FIG. 2, the MAIEAD 202 is coupled to a plurality of server devices 204(1)-204(n) that hosts a plurality of databases 206(1)-206(n), and also to a plurality of client devices 208(1)-208(n) via communication network(s) 210. A communication interface of the MAIEAMD 202, such as the network interface 114 of the computer system 102 of FIG. 1, operatively couples and communicates between the MAIEAD 202, the server devices 204(1)-204(n), and/or the client devices 208(1)-208 (n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MAIEAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MAIEAD 202 may be a standalone device or integrated with one or more other devices or apparatuses, such as one or more of the server devices 204(1)-204(n), for example. In one particular example, the MAIEAD 202 may be hosted by one of the server devices 204(1)-204(n), and other arrangements are also possible. Moreover, one or more of the devices of the MAIEAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the MAIEAD 202 via the communication network(s) 210 according to the HyperText Transfer Protocol (HTTP)-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store various types of data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

In some embodiments, the client devices 208(1)-208(n) in this example may include any type of computing device that can facilitate the implementation of the MAIEAD 202 that may efficiently provide a platform for implementing a method for using LLMs to act as agents to automatically extract specific types of information from regulatory filings and to aggregate the extracted information in order to generate structured responses to user queries, but the disclosure is not limited thereto.

The client devices 208(1)-208(n) may run interface applications, such as standard web browsers or standalone client applications, which may provide an interface to communicate with the MAIEAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the MAIEAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the MAIEAD 202, the server devices 204(1)-204(n), or the client devices 208(1)-208(n), for example, may be configured to operate as virtual instances on the same physical machine. For example, one or more of the MAIEAD 202, the server devices 204(1)-204(n), or the client devices 208(1)-208(n) may operate on the same physical device rather than as separate devices communicating through communication network(s) 210. Additionally, there may be more or fewer MAIEADs 202, server devices 204(1)-204(n), or client devices 208(1)-208 (n) than illustrated in FIG. 2. In some embodiments, the MAIEAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
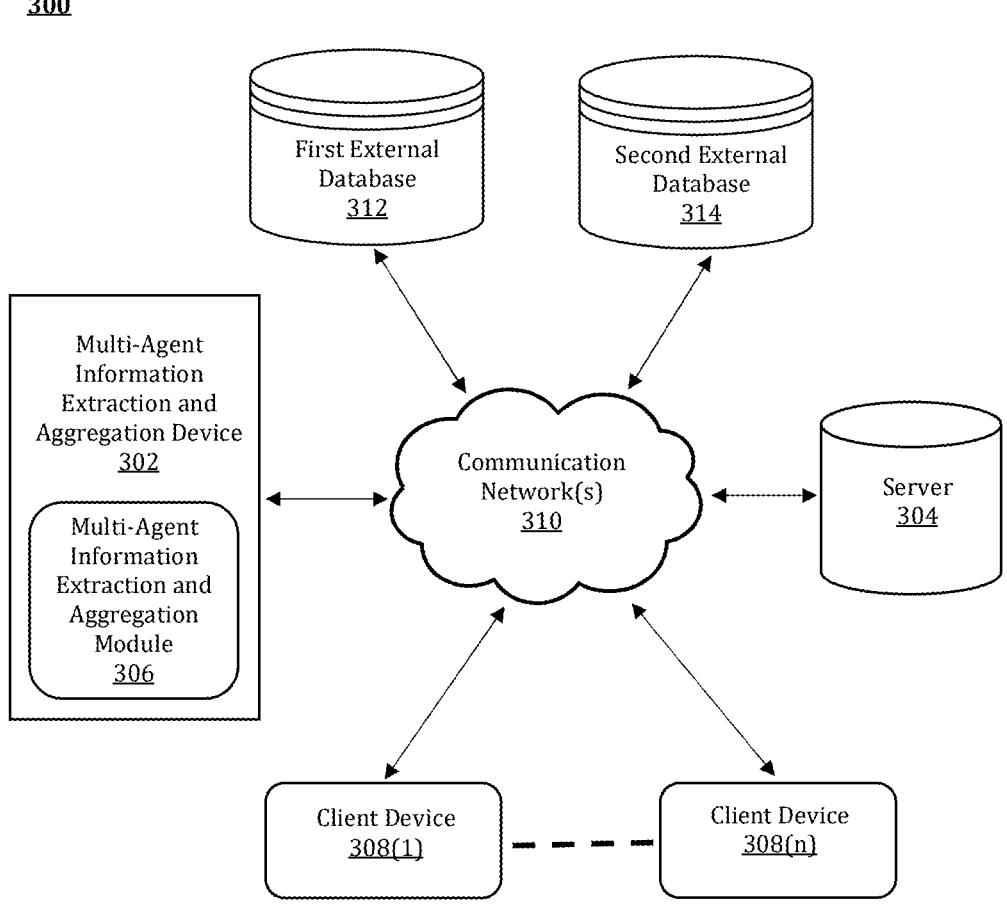
FIG. 3 illustrates a system diagram for implementing a method for using LLMs to act as agents to automatically extract specific types of information from regulatory filings and to aggregate the extracted information in order to generate structured responses to user queries, in accordance with an embodiment.

FIG. 3 illustrates a system diagram for implementing an MAIEAD 302 having a multi-agent information extraction and aggregation module (MAIEAM), in accordance with an embodiment.

As illustrated in FIG. 3, the system 300 may include an MAIEAD 302 within which an MAIEAM 306 is embedded, a server 304, a first external database 312, a second external database 314, a plurality of client devices 308(1) . . . 308(n), and a communication network 310.

In some embodiments, the MAIEAD 302 including the MAIEAM 306 may be connected to the server 304, and the database(s) 312 via the communication network 310. The MAIEAD 302 may also be connected to the plurality of client devices 308(1) . . . 308(n) via the communication network 310, but the disclosure is not limited thereto.

In an embodiment, the MAIEAD 302 is described and shown in FIG. 3 as including the MAIEAM 306, although it may include other rules, policies, modules, databases, or applications, for example. In some embodiments, the first external database 312 and/or the second external database 314 may be configured to store ready to use modules written for each application programming interface (API) for all environments. Although only one database is illustrated in FIG. 3, the disclosure is not limited thereto. Any number of desired databases may be utilized for use in the disclosed invention herein. The databases 312, 314 may be a mainframe database, a log database that may produce programming for searching, monitoring, and analyzing machine-generated data via a web interface, etc., but the disclosure is not limited thereto.

In some embodiments, the MAIEAM 306 may be configured to receive real-time feed of data from the plurality of client devices 308(1) . . . 308(n) and secondary sources via the communication network 310.

As may be described below, the MAIEAM 306 may be configured to: receive a query from a user; use a first LLM to act as a query replication LLM agent to transform the query into a plurality of action items; use a second LLM to act as a plan generator LLM agent to generate at least one plan for responding to each of the plurality of action items; use a third LLM to act as a plan selection LLM agent to select an optimum plan from among the generated at least one plan for executing each of the plurality of action items; use a fourth LLM to act as a plan orchestrator LLM agent to assemble a plurality of fifth LLMs to act as expert LLM sub-agents to perform respective tasks based on the selected optimum plan; obtain, from each of the expert LLM sub-agents, a respective output that results from a performance of the corresponding task; and use the plan orchestrator LLM agent to aggregate the respective outputs into a single response to the query, but the disclosure is not limited thereto.

The plurality of client devices 308(1) . . . 308(n) are illustrated as being in communication with the MAIEAD 302. In this regard, the plurality of client devices 308(1) . . . 308(n) may be "clients" (e.g., customers) of the MAIEAD 302 and are described herein as such. Nevertheless, it is to be known and understood that the plurality of client devices 308(1) . . . 308(n) need not necessarily be "clients" of the MAIEAD 302, or any entity described in association therewith herein. Any additional or alternative relationship may exist between either or both of the plurality of client devices 308(1) . . . 308(n) and the MAIEAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308(n) may communicate with the MAIEAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The MAIEAD 302 may be the same or similar to the MAIEAD 202 as described with respect to FIG. 2, including any features or combination of features described with respect thereto.

FIG. 4 illustrates an exemplary flow chart of a process 400 implemented by the MAIEAM 306 of FIG. 3 for enablement of a system and a method for using LLMs to act as agents to automatically extract specific types of information from regulatory filings and to aggregate the extracted information in order to generate structured responses to user queries, in accordance with an embodiment. It may be appreciated that the illustrated process 400 and associated steps may be performed in a different order, with illustrated steps omitted, with additional steps added, or with a combination of reordered, combined, omitted, or additional steps.

As illustrated in FIG. 4, at step S402, the process 400 may include receiving a query from a user. In an embodiment, the query may relate to information that would be useful to an asset manager, such as information about a client's portfolio. In many instances, it may be possible to respond to the query by gleaning information from publicly available governmental regulatory filings. However, the sheer volume of such data is immense, and therefore, obtaining the information that would be responsive to the query via a manual process may be very time-consuming and resource-intensive.

At step S404, the process 400 may include using a first LLM to act as a query replication LLM agent to transform the query into a set of action items. In an embodiment, this transformation may include any one or more of spelling out acronyms from within the query, determining a time frame for which the query is applicable, and rewording the query based on an input expectation associated with other LLM agents that may be configured to perform other functions that relate to the query.

At step S406, the process 400 may include using a second LLM to act as a plan generator LLM agent to generate one or more candidate plans for responding to each action item included in the set of action items. In an embodiment, the candidate plans may be generated by decomposing the action items into respective tasks that are suitable for performance by other LLM agents.

At step S408, the process 400 may include using a third LLM to act as a plan selection LLM agent to select an optimum plan from among the candidate plans generated in step S406 for executing each of the action items by performing the tasks associated with the action items. Then, at step S410, the process 400 may include using a fourth LLM to act as a plan orchestrator LLM agent to assemble a set of fifth LLMs to act as expert LLM sub-agents to perform the respective tasks based on the selected optimum plan.

In an embodiment, each expert LLM sub-agent is trained to perform a specific type of task that entails obtaining information from specific types of sources. For example, each expert LLM sub-agent may be configured to perform a respective task by extracting information from publicly available governmental regulatory filings, such as SEC filings. In an embodiment, each expert LLM sub-agent may be configured to operate independently with respect to the other expert LLM sub-agents.

At step S412, the process 400 may include using the plan orchestrator LLM agent to obtain the results of the performance of the respective tasks from the expert LLM sub-agents. In an embodiment, the plan orchestrator LLM agent may be configured to notify the user of a progress status at various stages, such as each time that a result of a performance of a task is received from one of the expert LLM sub-agents. In this aspect, when a particular expert LLM sub-agent is unable to successfully execute the corresponding task, the progress status may include a notification of the inability of that particular expert LLM sub-agent to complete its task.

At step S414, the process 400 may include using the plan orchestrator LLM agent to determine whether any of the results of the performance of the tasks include errors or hallucinations. In an embodiment, the plan orchestrator LLM agent may be configured to determine whether a particular task requires a reperformance and/or a re-execution by the corresponding expert LLM sub-agent. Then, at step S416, the process 400 may include using the plan orchestrator LLM agent to aggregate all of the results into a single response to the query received from the user in step S402.

In an embodiment, the present inventive concept contemplates using LLMs to generate a response to a user query by employing a methodology that entails decomposing the task, planning a series of actions that retrieve insights from a myriad of different knowledge sources, generating variations of those plans, selecting the most efficient plan, and orchestrating a well-oiled machine which executes on the plan through an agent-based framework. It is proposed that this intellectual pursuit is pertinent and essential for a number of reasons. Firstly, in many scenarios, the search function may involve the process of amalgamating different perspectives and/or sources, that also differ in terms of accessibility. Therefore, it is essential to modularize the planning process. Secondly, to view the chain of thought of the framework, it is essential to modularize the process so that hallucination and missteps are caught, especially as the search space expands. Thirdly, as the accuracy of generated data is essential, it is critical to deploy expert agents that are highly knowledgeable in each area of focus and/or expertise. Fourthly, it is critical to generate variations of a plan that envisions an accomplishment of the same goal. In other words, by generating different variations of a plan, it is possible to leverage the artificial general intelligence capabilities of the model, i.e., learning beyond the examples that are provided to the model.

In an embodiment, the present inventive concept "swarms" multiple LLM agents that have clearly different roles and expertise. The expert-driven modularization facilitates a highly efficient structure.

Figure 5:
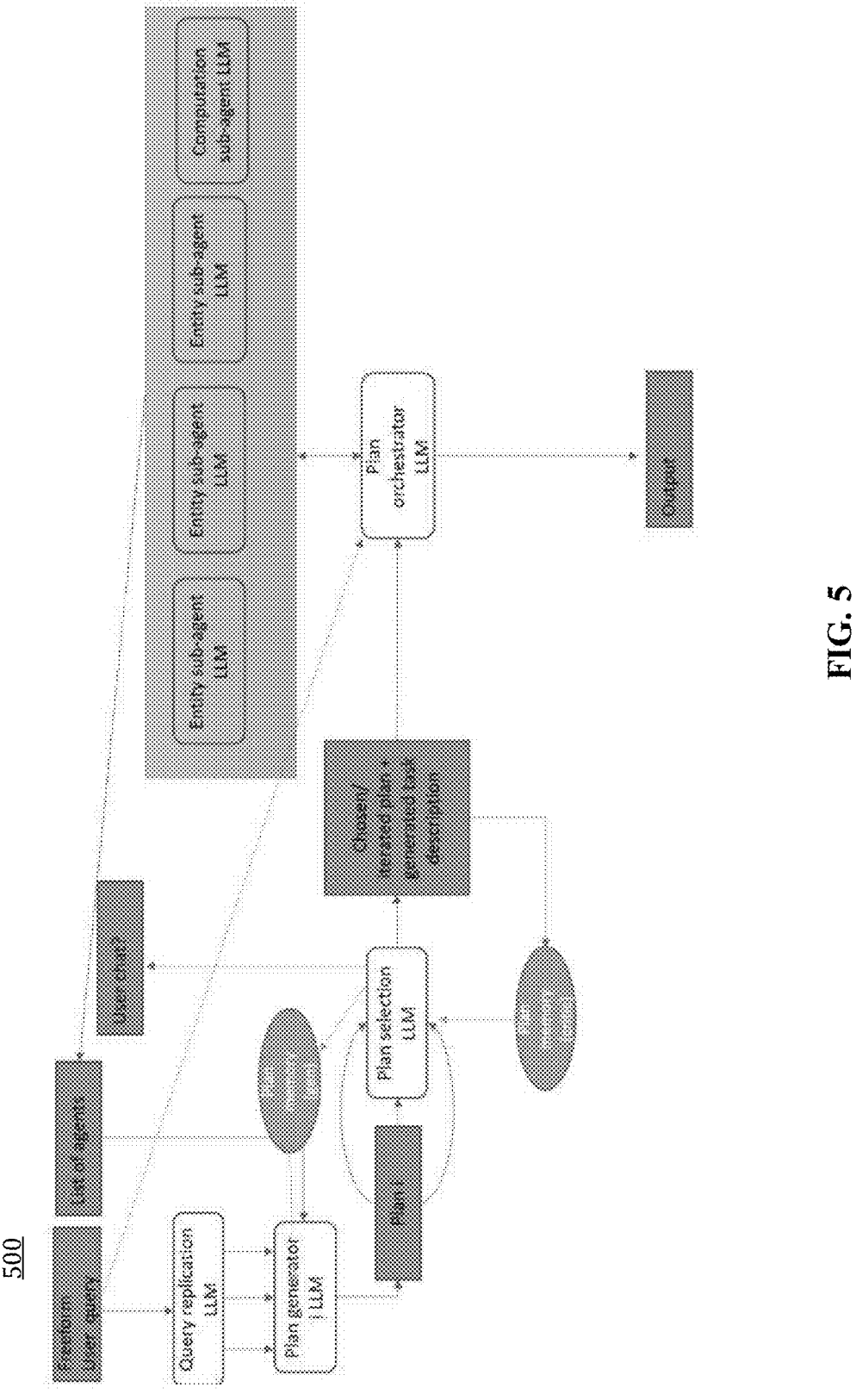
FIG. 5 illustrates a data flow diagram for implementing a method for using LLMs to act as agents to automatically extract specific types of information from regulatory filings and to aggregate the extracted information in order to generate structured responses to user queries, in accordance with an embodiment.

FIG. 5 illustrates a data flow diagram 500 for implementing a method for using LLMs to act as agents to automatically extract specific types of information from regulatory filings and to aggregate the extracted information in order to generate structured responses to user queries, in accordance with an embodiment.

Referring to FIG. 5, a freeform user query is received. A query replication agent replicates the freeform query into a tangible action item. In an embodiment, this agent creates semantically similar variants of the user query. This will provide an initial signal to the user regarding a) whether the query is valid and relevant to the system; and b) by rewording the query, whether the system understands the gist of the user's command. This agent is also responsible for adding any context around a user's query, such as, for example, spelling out acronyms, writing out years, and providing other suitable types of context.

LLMs are also stochastic in their output generation and are highly sensitive to slight variations in input prompt. In an embodiment, the query replication agent attempts to make the system more robust to LLM failures. For example, if a free-form user query of "get me the wallet share of [Bank 1] in options for q2" is received, it is important to replicate such a query into a clearer query. In an embodiment, via in-context learning, the LLM agent understands that this query may be replicated as follows: "calculate [Bank 1]'s wallet share for options in the second quarter of 2024" such that the query may be understood by a lay-person.

In an embodiment, a plan generator agent begins to generate a plan of actions that will help answer the user query. The plan generator agent may initially decompose the query into natural language steps followed by grounding the query in high level plans to the expert agent(s). In an embodiment, the plan generator agent's plan depends on how the query is decomposed.

Once the query is replicated into a clearer form, the agent begins decomposing the query to understand the actions to be undertaken. For example, the query may be decomposed as follows: 1) calculating wallet share; 2) calculating Bank 1's wallet share, with Bank 1 acting as either a broker or an asset manager; 3) after receiving user confirmation that Bank 1 is acting as the broker, calculating Bank 1's wallet share as the broker for a derivative instrument of options; and 4) calculating Bank 1's wallet share as the broker for the derivative instrument of options in the second quarter of 2024. Based on the elements resulting from the decomposition, this agent assigns a specific expert agent to each decomposed action.

Generating a plan for the decomposed actions: Continuing with the example above, 1) calculating wallet share may be performed by leveraging an NPORT regulatory filing type sub-agent; 2) calculating Bank 1's wallet share may be performed by leveraging an NCEN regulatory filing type sub-agent; 3) after receiving user confirmation that Bank 1 is acting as the broker, calculating Bank 1's wallet share as the broker for a derivative instrument of options may be performed by leveraging an NPORT governmental filing type sub-agent; and 4) calculating Bank 1's wallet share as the broker for the derivative instrument of options in the second quarter of 2024 may also be performed by leveraging the NPORT governmental filing type sub-agent.

In an embodiment, a key element is that the plan generator agent may be configured to generate a series of different types of plans, i.e., candidate plans. For example, instead of leveraging the NPORT sub-agent as described above, the plan generator agent may alternatively leverage an NCSR governmental filing type sub-agent to understand whether NCSR houses the pertinent information.

In an embodiment, one purpose of generating multiple types of plans is to optimize the planning process and implicitly train the plan generator agent to "think outside of the box" as well as executing on its implicit biases that are trained through in-context learning, i.e., providing examples to the model and having the model learn from those examples. The ability of this agent to think outside of the box and generate different plans may be important because there is a relatively high probability that the agent may conjure different plans with different sub-agents, in addition to the ones it is already aware of, based on its training via examples through in-context learning. In this aspect, as a human brain can think and plan beyond its current knowledge, this agent's potential expertise to generate creative plans may also be accounted for.

Referring again to FIG. 5, a plan selection agent selects the most efficient and appropriate plan amongst the different types of candidate plans that the plan generator agent has proposed. In an embodiment, this agent acts as an expert critic to evaluate the feasibility of various action plans. For instance, this agent may discount submitted plans that have superfluous sub-agent calls or plans that do not tackle the user's request. In an embodiment, this selection process also enables the system to self-learn, thereby discovering new types of metrics that may be essential but had previously been unknown.

In an embodiment, the modularization of this process also facilitates a capability to check at which stage the system makes a mistake, i.e., as between selection of an optimal plan versus generation of candidate plans. In an embodiment, plans selected at this stage may be added into memory for both the plan selection and plan generation agents. This avoids the need to regenerate the same plan for the same task by different users. Further, tasks that are sufficiently similar could be leveraged as prior knowledge by the agent in generating a new plan. In addition, erroneous plans that were ignored by the plan selection agent may be added into the feedback loop as negative samples.

Referring again to FIG. 5, a plan orchestrator agent may begin orchestrating the execution of the selected plan. This orchestration includes the assembling of expert sub-agent that may be configured to undertake the plan. In an embodiment, key functionalities of the plan orchestrator agent may include the following: 1) Central "Brain"/Focal Point of Execution: The plan orchestrator agent may compile answers from each expert sub-agent. In an embodiment, the expert sub-agents do not interact with each other. This set-up may be critical, because each expert sub-agent may have expertise in highly confidential areas. Moreover, the independent interaction of the expert sub-Agents may cause friction and therefore, computational inefficiency with the plan orchestrator agent. Therefore, in an embodiment, the key action of assembling expert sub-agents and interacting with them is assigned to the plan orchestrator agent.

2) Measuring of Error/Success: In an embodiment, as the expert sub-agents deliver their executed answers back to the plan orchestrator agent, the plan orchestrator agent then determines whether there are any errors in the code, such as, for example, hallucinated variables, and/or any other types of errors. Additionally, the plan orchestrator again may be tasked with determining whether any individual steps need to be redone and/or recomputed, as well as whether an early termination is indicated.

3) Informing User of Progress: In an embodiment, as the expert sub-agents deliver their answers, the plan orchestrator agent serves as an informant to the user in terms of relaying progress. In this aspect, if one expert sub-agent is unable to execute its task, the plan orchestrator may notify the user.

4) In an embodiment, the plan orchestrator agent facilitates a parallel framework of execution in which each expert sub-agent may execute on its actions simultaneously. Instead of a sequential computational framework that is more costly and timely, the plan orchestrator agent may enable each expert sub-agent to execute concurrently while also communicating with them to track progress and coordinate.

In an embodiment, each expert sub-agent is skilled in its expertise and only in its expertise. For example, using a different example for a user query, if the user query is "Book the cheapest flights to Dubrovnik, Croatia", the expert sub-agents may include Travel Agency 1, Travel Agency 2, Booking Agency 1, Booking Agency 2, etc. In this example, it may be impractical and impossible to have each expert sub-agent interact with each other, as each travel agency has proprietary information.

In an embodiment, each expert sub-agent may have flexibility to interact with texts, images, code, web pages, data-frames, and databases. Each expert sub-agent may also have support agents, such as data manipulation agents and/or memory constraint agents, that may be configured to independently support the corresponding expert sub-agent's execution In some embodiments as disclosed above in FIGS. 1-5, technical improvements effected by the instant disclosure may include a platform for implementing a multi-agent information extraction and aggregation module configured for enablement of using LLMs to act as agents to automatically extract specific types of information from regulatory filings and to aggregate the extracted information in order to generate structured responses to user queries, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium may be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for using large language models (LLMs) to extract and aggregate information in order to generate a structured response to a user query, the method being implemented by at least one processor, the method comprising:

receiving a query from a user;

using a first LLM to act as a query replication LLM agent to transform the query into a plurality of action items;

using a second LLM to act as a plan generator LLM agent to generate at least one plan for responding to each of the plurality of action items;

using a third LLM to act as a plan selection LLM agent to select an optimum plan from among the generated at least one plan for executing each of the plurality of action items;

using a fourth LLM to act as a plan orchestrator LLM agent to assemble a plurality of fifth LLMs to act as expert LLM sub-agents to perform respective tasks based on the selected optimum plan;

obtaining, from each of the expert LLM sub-agents, a respective output that results from a performance of the corresponding task; and using the plan orchestrator LLM agent to aggregate the respective outputs into a single response to the query, wherein the method further comprises using the plan orchestrator LLM agent to notify the user of a progress status each time the respective output that results from the performance of the corresponding task when the respective output is obtained from each of the expert LLM sub-agents, wherein each of the expert LLM sub-agents do not interact with each other, and wherein when a particular one of the expert LLM sub-agents is unable to successfully execute the corresponding one of the respective tasks, the progress status includes information that relates to the inability of the particular one of the expert LLM sub-agents to successfully execute the corresponding one of the respective tasks.

2. The method of claim 1, wherein each expert LLM sub-agent is configured to generate the respective output by extracting information from a plurality of publicly available governmental regulatory filings.

3. The method of claim 2, wherein the plurality of publicly available governmental regulatory filings includes filings that relate to securities transactions.

4. The method of claim 1, wherein the query replication LLM agent is configured to transform the query into the plurality of action items by spelling out acronyms from within the query, determining a time frame for which the query is applicable, and rewording the query based on an input expectation associated with the planning generator LLM agent.

5. The method of claim 1, wherein the plan generator LLM agent is configured to generate the at least one plan for responding to the plurality of action items by decomposing the plurality of action items into the respective tasks that are suitable for performance by at least one of the expert LLM sub-agents.

6. The method of claim 1, wherein each expert LLM sub-agent is configured to operate independently with respect to the other expert LLM sub-agents.

7. The method of claim 1, wherein the plan orchestrator LLM agent is configured to determine, for each respective output obtained from one of the expert LLM sub-agents, whether the respective output includes at least one from among an error and a hallucinated result.

8. The method of claim 7, wherein the plan orchestrator LLM agent is further configured to determine whether any of the respective tasks requires a reperformance.

9. A computing apparatus for using large language models (LLMs) to extract and aggregate information in order to generate a structured response to a user query, the computing apparatus comprising:

a processor;

a memory; and a communication interface coupled to each of the processor and the memory, wherein the processor is configured to:

receive, from a user via the communication interface, a query;

use a first LLM to act as a query replication LLM agent to transform the query into a plurality of action items;

use a second LLM to act as a plan generator LLM agent to generate at least one plan for responding to each of the plurality of action items;

use a third LLM to act as a plan selection LLM agent to select an optimum plan from among the generated at least one plan for executing each of the plurality of action items;

use a fourth LLM to act as a plan orchestrator LLM agent to assemble a plurality of fifth LLMs to act as expert LLM sub-agents to perform respective tasks based on the selected optimum plan;

obtain, from each of the expert LLM sub-agents, a respective output that results from a performance of the corresponding task; and use the plan orchestrator LLM agent to aggregate the respective outputs into a single response to the query, wherein the processor is further configured to use the plan orchestrator LLM agent to notify the user of a progress status each time the respective output that results from the performance of the corresponding task is obtained from each of the expert LLM sub-agents, wherein each of the expert LLM sub-agents do not interact with each other, and wherein when a particular one of the expert LLM sub-agents is unable to successfully execute the corresponding one of the respective tasks, the progress status includes information that relates to the inability of the particular one of the expert LLM sub-agents to successfully execute the corresponding one of the respective tasks.

10. The computing apparatus of claim 9, wherein each expert LLM sub-agent is configured to generate the respective output by extracting information from a plurality of publicly available governmental regulatory filings.

11. The computing apparatus of claim 10, wherein the plurality of publicly available governmental regulatory filings includes filings that relate to securities transactions.

12. The computing apparatus of claim 9, wherein the query replication LLM agent is configured to transform the query into the plurality of action items by spelling out acronyms from within the query, determining a time frame for which the query is applicable, and rewording the query based on an input expectation associated with the planning generator LLM agent.

13. The computing apparatus of claim 9, wherein the plan generator LLM agent is configured to generate the at least one plan for responding to the plurality of action items by decomposing the plurality of action items into the respective tasks that are suitable for performance by at least one of the expert LLM sub-agents.

14. The computing apparatus of claim 9, wherein each expert LLM sub-agent is configured to operate independently with respect to the other expert LLM sub-agents.

15. The computing apparatus of claim 9, wherein the plan orchestrator LLM agent is configured to determine, for each respective output obtained from one of the expert LLM sub-agents, whether the respective output includes at least one from among an error and a hallucinated result.

16. The computing apparatus of claim 15, wherein the plan orchestrator LLM agent is further configured to determine whether any of the respective tasks requires a reperformance.

17. A non-transitory computer readable storage medium storing instructions for using large language models (LLMs) to extract and aggregate information in order to generate a structured response to a user query, the storage medium comprising executable code which, when executed by a processor, causes the processor to:

receive a query from a user;

use a first LLM to act as a query replication LLM agent to transform the query into a plurality of action items;

use a second LLM to act as a plan generator LLM agent to generate at least one plan for responding to each of the plurality of action items;

use a third LLM to act as a plan selection LLM agent to select an optimum plan from among the generated at least one plan for executing each of the plurality of action items;

use a fourth LLM to act as a plan orchestrator LLM agent to assemble a plurality of fifth LLMs to act as expert LLM sub-agents to perform respective tasks based on the selected optimum plan;

obtain, from each of the expert LLM sub-agents, a respective output that results from a performance of the corresponding task; and use the plan orchestrator LLM agent to aggregate the respective outputs into a single response to the query, wherein when executed, the executable code further causes the processor to use the plan orchestrator LLM agent to notify the user of a progress status each time the respective output that results from the performance of the corresponding task is obtained from each of the expert LLM sub-agents, wherein each of the expert LLM sub-agents do not interact with each other, and wherein when a particular one of the expert LLM sub-agents is unable to successfully execute the corresponding one of the respective tasks, the progress status includes information that relates to the inability of the particular one of the expert LLM sub-agents to successfully execute the corresponding one of the respective tasks.

18. The storage medium of claim 17, wherein each expert LLM sub-agent is configured to generate the respective output by extracting information from a plurality of publicly available governmental regulatory filings.

* * * * *